H. B. DURFEE.
Plow.
No. 3,753. Reissued Nov. 30, 1869.
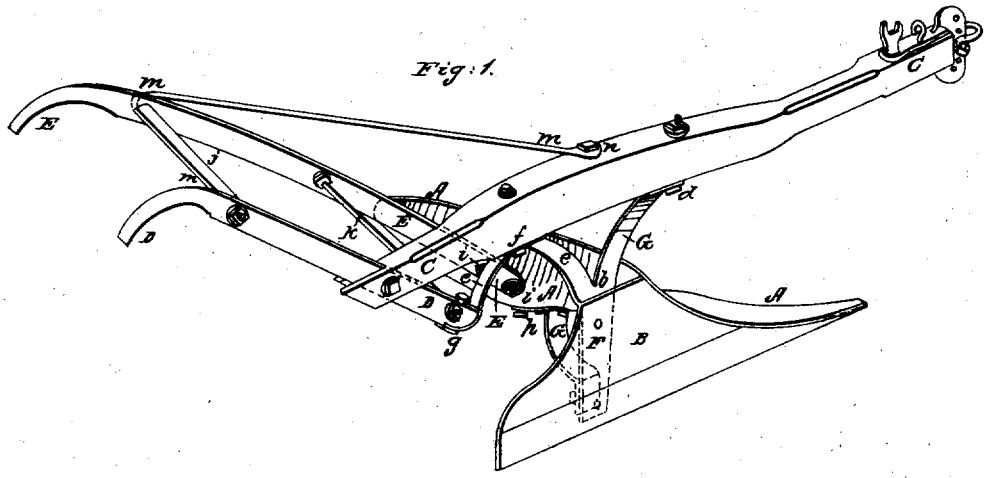
Witnesses:
Chas. B. Wilson
Edmund Masson.
Inventor:
H. B. Durfee.
By A. B. Stoughton.
Attorney
N. PETERS, Photo-Lithographer, Washington, D. C.

UNITED STATES PATENT OFFICE.

H. B. DURFEE, OF DECATUR, ILLINOIS.

IMPROVEMENT IN PLOWS.

Specification forming part of Letters Patent No. 90,246, dated May 18, 1869; Reissue No. 3,753, dated November 30, 1869.

*To all whom it may concern:*

Be it known that I, H. B. DURFEE, of Decatur, in the county of Macon and State of Illinois, have invented certain new and useful Improvements in Plows; and I do hereby declare the following to be a full, clear, and exact description of the same, reference being had to the accompanying drawing, making a part of this specification, and which represents a perspective view of the plow in question, and is designated as Figure 1.

The object and purpose of this invention is to secure an open landside, as also a free escape for the trash and clods that fall over the mold-board; and the nature of the invention consists in the use of a short handle on the landside portion of the plow, properly braced to or from the beam or standard, or both, so as to leave the open or clear space above mentioned, and still have the rigidity necessary for guiding, directing, or moving the plow.

To enable others skilled in the art to make and use my invention, I will proceed to describe the same with reference to the drawings.

A represents the mold-board, B the landside, C the beam, and D E the handles, of the plow. The standard F is bolted to the landside, as at *a a*, and just above the landside it may be forked, as at *b*, one branch—viz., that marked *c*—extending forward and united to the beam at *d*. The other branch—viz., that marked *e*—extending rearward and bolted to the beam at *f*, projects still farther rearward, and at *g* is bolted to the handle D, so as to brace the handle to or from both the standard and beam. The brace or branch *e*, I prefer to make in one piece with the standard; but it is obvious that if separated at *f*, and the two parts or ends are bolted to the beam by a single bolt or by two bolts, it would serve the same purpose of bracing, though probably it would not be so rigid. The purpose is to brace the short handle to the standard, or to the beam, or to both, by the brace *e*, extending from one or both, and secured by bolts or other fastenings at each of its ends, so as to make the short handle sufficiently rigid for all useful purposes without interfering with the open space landside and the clearance of sods, &c., that drop over the mold-board. On the inside of the landside B, and at or near where the standard F is bolted thereto, there is secured one end of a brace, C, which extends across and is bolted to the inside of the mold-board A, as seen at *h*. This brace G firmly holds and braces the landside and mold-board at their after and under portions. The handle E is bolted to the mold-board at *i*, and this handle, beside being united to its mate or fellow D by the brace *j* and screw-rod *k*, is also united to it and to the beam C by means of the brace-rod *m*, which, after uniting the handles D E, is bent around the latter handle, and thence extending to and fastened on the beam at the point *n*. This brace-rod makes a strong union between the handles and the beam, and admits of a ready guiding of the plow by the handles. The short handle D is secured at or near the rear end of the beam C, and then extends a short distance below said beam, and its lower end is braced by the brace *e* to the standard or beam, or to both, which makes it sufficiently rigid for all practical purposes, and leaves the open landside-space and clearance for the clogging material that drops over the mold-board, which the extension of the handle either to the landside or to the mold-board would interfere with and destroy, as the former plan would pass through the landside open space, and the latter would cross the clearance space, and render either or both useless for allowing clods, sods, or other obstructing matter to freely pass such spaces.

Having thus fully described my invention, what I claim therein as new, and desire to secure by Letters Patent, is—

1. The combination and arrangement of the beam and short handle for the purpose of leaving an open landside-space and clearance for the clogging material that drops over the mold-board, substantially as described.

2. In combination with the short handle D, a brace, *e*, extending therefrom to the standard or beam, or both, substantially as and for the purpose described.

H. B. DURFEE.

Witnesses:

WM. E. WINHOLTZ,
C. M. DURFEE.